F. A. FOX.
TIRE TREAD ATTACHMENT.
APPLICATION FILED SEPT. 12, 1908.
915,840.
Patented Mar. 23, 1909.
2 SHEETS—SHEET 1.
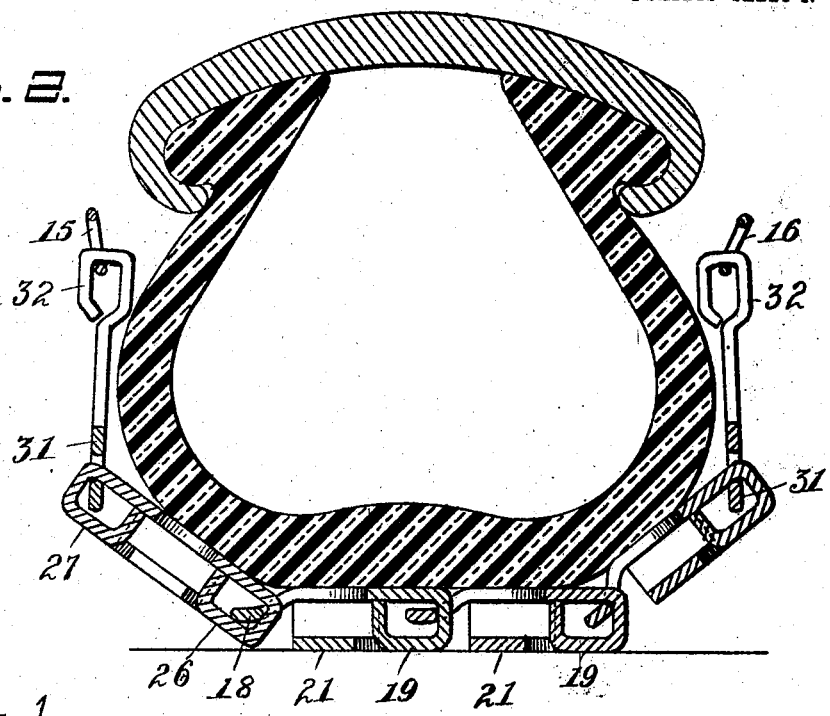
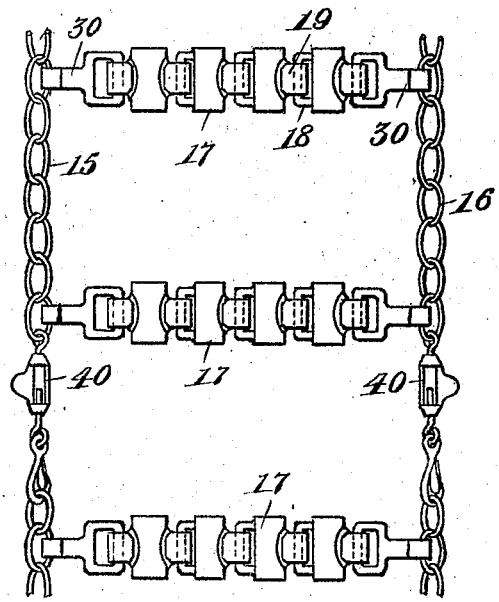
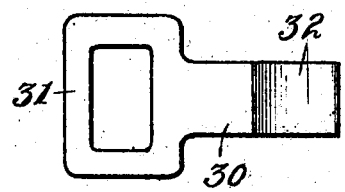
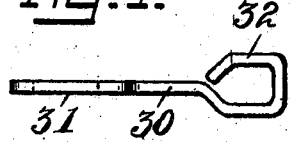
Witnesses:
H. D. Penney
A. B. Mattingly
Inventor:
Frank A. Fox,
By his Attorney, F. H. Richards.

F. A. FOX.
TIRE TREAD ATTACHMENT.
APPLICATION FILED SEPT. 12, 1908.
915,840.
Patented Mar. 23, 1909.
2 SHEETS—SHEET 2.
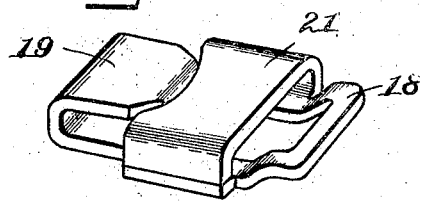
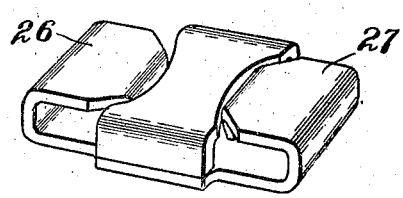
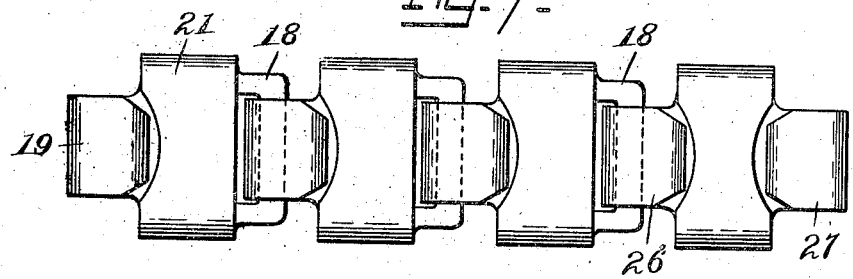
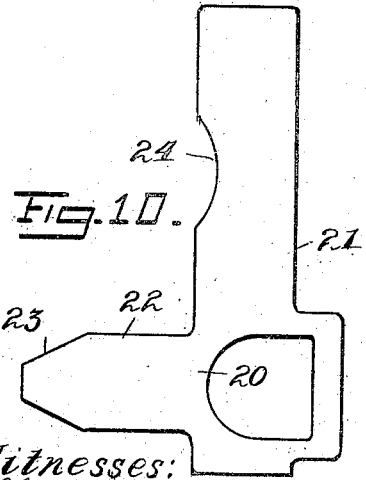
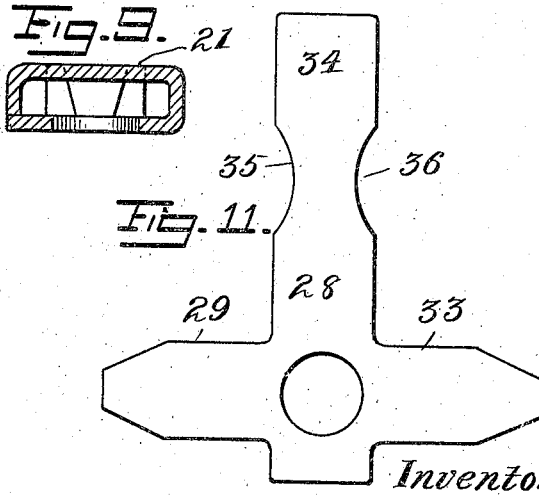
Witnesses:
H. D. Penney
A. B. Mattingly
Inventor:
Frank A. Fox,
By his Attorney, F. H. Richards.

UNITED STATES PATENT OFFICE.

FRANK A. FOX, OF NEW YORK, N. Y., ASSIGNOR TO FOX METALLIC TIRE BELT COMPANY, OF NEW YORK, N. Y., A CORPORATION OF NEW YORK.

TIRE-TREAD ATTACHMENT.

No. 915,840.        Specification of Letters Patent.        Patented March 23, 1909.

Application filed September 12, 1908. Serial No. 452,770.

*To all whom it may concern:*

Be it known that I, FRANK A. FOX, a citizen of the United States, residing in New York city, in the county of New York and State of New York, have invented certain new and useful Improvements in Tire-Tread Attachments, of which the following is a specification.

This invention relates to anti-skid attachments for elastic tires, particularly those of the pneumatic type; which prevent slipping of the wheel both laterally and longitudinally of the road.

The object of the invention is to provide an improved form of device that will be of simple construction and of comparatively light weight, yet will have a very large gripping surface for engagement with the road, and at the same time will have a comparatively flat tire engaging face.

In the accompanying drawings illustrating embodiments of my invention, Figure 1 shows a view of a portion of the device stretched out in a plane. Fig. 2 is a transverse section through a wheel tire with the chain attached. Fig. 3 is a plan view and Fig. 4 a side elevation of one of the attaching links or members. Fig. 5 is a perspective view of one of the cross links. Fig. 6 shows one of the links at one end portion having the double hook for connection with the side chain. Fig. 7 is a plan view of one of the cross members. Fig. 8 is a longitudinal section of the chain shown in Fig. 7. Fig. 9 is a cross section of one of the links. Fig. 10 shows the blank from which the link of Fig. 5 is formed and Fig. 11 shows the blank for the link of Fig. 6.

The device is shown as comprising two side members of any desired flexible formation, preferably of chains 15 and 16 between which are connected the independent cross members 17 preferably equal distances apart and at right angles with the side members. The cross member shown in Fig. 7 is formed of a number of links such as shown in Fig. 5. These links are articulated or hinged together, preferably by having an eye portion 18 on one side and a hook portion 19 on the other side. The eye portion is of a width to receive the hook 19 of an adjacent link as shown in Fig. 7. The eye portion is preferably bent upward as shown so that the links can all lie in the same plane. Between the attaching portions of these links is a loop extending across the center portion of the link and having a comparatively flat tread surface. This loop is preferably formed from the blank 20 shown in Fig. 10 by providing an integral tongue 21 that is first bent upward a short distance, then bent across the central portion of the link with its extremity bent downward to engage the base portion of the link, as clearly shown in Figs. 5 and 9. The flat tread face of the loop is substantially parallel with the base of the link and forms a comparatively large tread surface.

The hook portion 19 is shown as formed from a tongue 22 that is bent upward and then across substantially parallel with the base of the link with its extremity bent downward to engage with the base of the link as shown in Figs. 5 and 8, thereby is formed a substantially flat tread face by this hook portion, that is preferably in the same plane as the flat tread portion of the transverse loop. The extremity of the tongue 22 is formed converging at 23; and the tongue 21 may have a recess 24 into which the extremity of the hook 19 extends, as shown in Fig. 8. For the purpose of securing these cross members to the side chains, a connecting member 30 is formed, comprising an eye portion 31 and a hook portion 32. The eye portion is connected with the hook 19 at one end of the chain while the hook portion 32 engages one of the links of the side chain but at the other end of the cross member instead of the eye 18, the link is provided with two hooks 26 and 27 as shown in Fig. 6, which hooks are identical with the hook 19 shown in Fig. 5. This link member is formed from the blank 28 shown in Fig. 11, by providing oppositely extending tongues 29 and 33 that are bent three times upon itself, as described with relation to the hook 19. With this construction the tongue 34 is provided with two recesses 35 and 36 into which these hook members project as shown. The hook 26 engages one of the eyes 18, while the hook 27 engages the eye 31 of the connecting member.

With this form of tread member, it will be seen that there is provided a comparatively large tread surface, formed by the transverse loop 21, and the tread surface of the hook portion 19, also the double hook portion of the end links shown in Fig. 6 as well as the transverse member in such link. It will further be seen that the base or tire engaging face of the links is comparatively flat and will not serve to injure the tire. The side edges of the hook members and loop members will serve to engage the road and effectually prevent skidding or slippage both laterally and longitudinally. When the load is put on the tire it will compress and flatten out as shown in Fig. 2, from which it will be seen that practically the whole tread surface of three links at least engage the road where it is a paved street or so hard as not to compress. But where the road is soft the tire will sink in and make a groove or trough in which case more of the tread surface of the cross members engages the ground. It will also be seen that in case of deep ruts these members will engage the sides of the ruts and prevent the side wear or cutting of the tire that is of far greater damage to pneumatic tires than the wear on the bottom tread surface.

The meeting ends of the side chains are detachably secured together in any suitable manner preferably by turn buckles 40, whereby the device is secured in place on the wheel, but can be removed when desired.

Having thus described my invention, I claim:

1. A tread attachment for tires comprising side members, cross members secured at their respective ends to the side members, each cross member consisting of a series of links articulated at their ends, the links having a loop composed of part bent upward at one lateral side and across the center and down on the opposite side to engage the base.

2. A tread attachment for tires comprising side members, cross members secured at their respective ends to the side members, each cross member consisting of a series of links articulated at their ends, the links having a loop composed of part bent upward at one lateral side and across the center and down on the opposite side to engage the base, and a link member having hook portions at opposite ends adapted to engage the eye portion of one of said links, the links having an integral loop extending upward at one side and transversely across between said hook portions and then down to the base on the opposite side.

FRANK A. FOX.

Witnesses:
H. D. PENNEY,
WILLIAM H. REID.